(No Model.)
A. J. SPEARE.
BUDDING KNIFE.
No. 510,204. Patented Dec. 5, 1893.
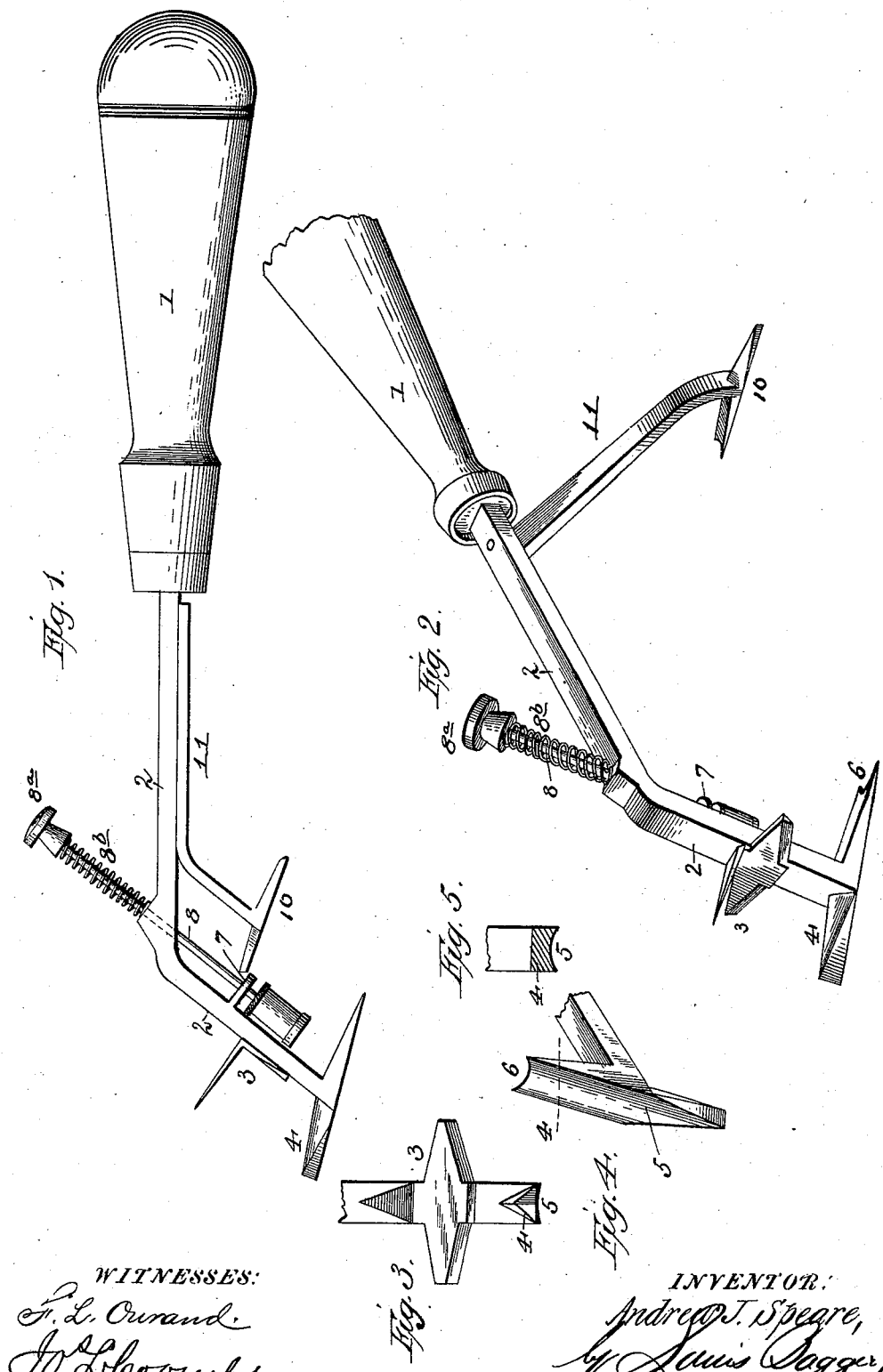

UNITED STATES PATENT OFFICE.

ANDREW JACKSON SPEARE, OF THAYER, MISSOURI.

BUDDING-KNIFE.

SPECIFICATION forming part of Letters Patent No. 510,204, dated December 5, 1893.

Application filed September 16, 1893. Serial No. 485,662. (No model.)

*To all whom it may concern:*

Be it known that I, ANDREW JACKSON SPEARE, a citizen of the United States, and a resident of Thayer, in the county of Oregon and State of Missouri, have invented certain new and useful Improvements in Budding-Knives; and I do hereby declare that the following is a full, clear, and exact description of the invention, which will enable others skilled in the art to which it appertains to make and use the same, reference being had to the accompanying drawings, which form a part of this specification.

My invention relates to improvements in budding-knives for cutting buds and inserting them beneath the bark of fruit trees.

The object of the invention is to provide a knife by which the operation of budding can be effected in a rapid and efficient manner.

The invention consists in the novel construction and combination of parts hereinafter fully described and claimed.

In the accompanying drawings: Figure 1 is a side view of a budding-knife constructed in accordance with my invention, the small blade being closed. Fig. 2 is a perspective view, the small blade being opened. Figs. 3, 4 and 5 are detail views.

In the said drawings, the reference numeral 1 designates a handle of any suitable shape and material, to one end of which is fixed a bent arm 2, provided near the outer end with cutters or blades 3. At its outer end this arm is provided or formed with a cutter 4, consisting of a small metal block, having a groove 5, in its under side, see Figs. 4 and 5, and having its front end beveled on opposite sides forming a point. The rear end of this block on its upper side is beveled to a sharp edge, and cut away or recessed, as shown, forming a semicircular or curved cutting edge 6. Passing through a slot in arm 2 and also through an aperture in lug 7, secured to said arm, is a rod 8, provided at its lower end with a small block or piece of rubber or other suitable material. The upper end of this rod is provided with a head 8ª and a coiled spring 8ᵇ. Pivoted to arm 1 near its inner end is an arm 11 provided with a block 10, similar to but somewhat smaller than the block on the end of arm 2.

The manner of using the device is as follows: The top of the piece to be inserted in the tree is cut by means of knives or blades 3. Then the implement is held with the curved cutting-blade 6 pointing toward the operator, as seen in Fig. 1, and then said blade is engaged with the bottom of the bud. The implement is now drawn toward the operator until the bud is almost cut through by the curved blade. Then the rod 8 is pushed down clasping the bud between the rubber and the upper rear side 18 of the cutter 4. By a gentle pull the bud is now completely detached from the limb, and the point of the cutter 4 is pushed into the bark of the tree to be budded, carrying with it the bud. The rod 8 is then released and the cutter pushed a little farther in when the bud is free. The cutter is now lifted from beneath the bark and the bud shoved clear down by said cutter.

The block 10 is employed for budding very small trees. In use it is opened or turned at approximately a right angle, as seen in Fig. 2. The bud which has been detached as before stated, is placed on the rear upper end of this block. The point of the blade is then shoved into the bark and following it with the left hand the bud is started and inserted in the tree, and the block then withdrawn, as before described.

Having thus described my invention, what I claim is—

1. A budding-knife comprising the handle, the bent arm, the grooved and pointed block or blade having a beveled rear end and a semicircular cutting edge, and the spring actuated rod; substantially as described.

2. The combination of the handle, the bent arm, the knives fixed to said arm near the outer end, the grooved and pointed block or blade having a rear beveled end formed with a semicircular cutting edge, and the spring actuated rod; substantially as described.

3. In a budding knife, the combination with the handle, the bent arm, the blades secured thereto, the grooved block or blade having a rear beveled end formed with a semi-circular cutting edge, and the spring actuated rod, of the arm pivoted to said bent arm near the handle, and provided with a block having one end pointed and the other end formed with a groove, substantially as described.

In testimony that I claim the foregoing as my own I have hereunto affixed my signature in presence of two witnesses.

ANDREW JACKSON SPEARE.

Witnesses:
G. M. DURST,
L. C. TABER.